(12) United States Patent
Hazen (10) Patent No.: US 11,407,263 B1
(45) Date of Patent: Aug. 9, 2022

(54) SWIVEL TRAILER

(71) Applicant: Donald B. Hazen, Zephyrhills, FL (US)

(72) Inventor: Donald B. Hazen, Zephyrhills, FL (US)

( * ) Notice: Subject to any disclaimer, the term of this patent is extended or adjusted under 35 U.S.C. 154(b) by 0 days.

(21) Appl. No.: 17/235,638

(22) Filed: Apr. 20, 2021

(51) Int. Cl.
| | |
|---|---|
| *B62D 13/04* | (2006.01) |
| *B60D 1/34* | (2006.01) |
| *B60D 1/167* | (2006.01) |
| *B60D 1/66* | (2006.01) |
| *B60D 1/36* | (2006.01) |
| *B60D 1/145* | (2006.01) |

(52) U.S. Cl.
CPC ............. *B60D 1/145* (2013.01); *B60D 1/167* (2013.01); *B60D 1/34* (2013.01); *B62D 13/04* (2013.01); *B60D 1/363* (2013.01); *B60D 1/665* (2013.01)

(58) Field of Classification Search
CPC .......... B60D 1/167; B60D 1/245; B60D 1/34; B60D 1/363; B60D 1/665; B62D 13/04
USPC ................................. 280/442, 494, 493, 492
See application file for complete search history.

(56) References Cited

U.S. PATENT DOCUMENTS

| | | | | |
|---|---|---|---|---|
| 5,232,240 | A * | 8/1993 | Johnson | B60D 1/54 280/491.4 |
| 5,465,993 | A * | 11/1995 | Gee | B60D 1/143 280/475 |
| 5,725,233 | A * | 3/1998 | Gee | B60D 1/143 280/406.2 |
| 6,626,449 | B2 * | 9/2003 | Hazen | B60D 1/065 280/460.1 |
| 7,837,216 | B1 * | 11/2010 | Greaves, Jr. | B60D 1/167 280/491.4 |
| 9,475,530 | B1 * | 10/2016 | Moyer | B60B 33/0039 |
| 2005/0046146 | A1 * | 3/2005 | Plante | B60D 1/065 280/460.1 |
| 2007/0194557 | A1 * | 8/2007 | Caporali | B60D 1/242 280/493 |
| 2010/0013190 | A1 * | 1/2010 | Koch | B62D 53/021 280/492 |
| 2010/0187489 | A1 * | 7/2010 | Hebert | B60D 1/246 254/420 |
| 2013/0140792 | A1 * | 6/2013 | Harkcom | B60D 1/075 280/494 |

* cited by examiner

*Primary Examiner* — Minnah L Seoh
*Assistant Examiner* — Hosam Shabara
(74) *Attorney, Agent, or Firm* — Cygnet IP Law, P.A.; Stephen W. Aycock, II (57) ABSTRACT

A swivel trailer is described that can include a swivel hitch and swivel axle configuration which prevents a vehicle and trailer from jackknifing.

12 Claims, 10 Drawing Sheets

SWIVEL TRAILER

FIELD

Some implementations relate generally to trailers and hitch systems, and more specifically to a swivel trailer that includes a swivel hitch and swivel axle configuration which prevents a vehicle and trailer from jackknifing.

BACKGROUND

A trailer is a nonautomotive vehicle (e.g., boat trailer, lawn trailer, etc.) designed to support a load and is transported by a vehicle. A typical trailer is coupled to a vehicle with some type of hitch (e.g., ball hitch, fifth wheel hitch, gooseneck hitch, pintle hitch). These hitches have one thing in command in that they couple the vehicle and trailer together but also allowing them to pivot frog one another.

In some cases, it is desired for the vehicle and trailer to pivot from one another allowing a user to maneuver a trailer into tight spots. However, sometimes while backing up a trailer, this can be a hassle and can allow the vehicle and trailer to get into a jackknife position.

Embodiments were conceived in light of the above-mentioned problems and limitations, among other things. The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

SUMMARY

Some implementations can include a swivel trailer and hitch system comprising: a frame support having a first attachment point, a second attachment point, and a third attachment point; a swivel hitch receiver having a first coupler a second coupler and a third coupler, where in the third coupler is constructed to couple to a vehicle; a swivel hitch having a first side and a second side, wherein the first side includes a center attachment point constructed to couple to the frame's first attachment point and pivot on a y axis, wherein the second side includes a first coupler and a second coupler constructed to couple to the swivel hitch receiver's first coupler a second coupler and pivot on an x axis; a first swivel axle constructed to couple to the second attachment point at a rear position; and a second swivel axle constructed to couple to the third attachment point at a rear position.

Some implementations can include a swivel hitch comprising a swivel hitch; a receiver; a first guide receiver; and a second guide receiver. In some implementations, the first and second guide receiver each include a locking pin. In some implementations, the swivel hitch can further include a first stabilizer support and a second stabilizer support. In some implementations, the swivel hitch can further include a first x pivot stop and a second x pivot stop.

In some implementations, the swivel hitch can further include an electric jack. In some implementations, the swivel hitch can further include a manual jack.

Some implementations can include a swivel axle comprising a vertical spindle base mount constructed to attached to a trailed frame; a caster assembly channel constructed to rotate on a z axis on the vertical spindle base mount; and a caster wheel assembly having an axle spindle and constructed to attached to the caster assembly channel at a first attachment point and a second attachment point, wherein the first attachment point allows the caster wheel assembly to rotate x axis, wherein the second attachment point is constructed to apply a counter force.

In some implementations, the swivel axle springs supply a counter force. In some implementations, the caster assembly channel includes a bearing housing/caster disk support and a spindle nut and washer. In some implementations, a set of spindle anti-friction disk and a spindle steel disk form a first slip joint between the vertical spindle base mount and caster assembly channel, wherein a set of caster anti-friction disk and a caster steel disk form a second slip joint between the bearing housing/caster disk support and the spindle nut and washer.

In some implementations, the caster wheel assembly includes a pivot bolt support tube. In some implementations, the caster wheel assembly includes a spring support.

DETAILED DESCRIPTION

Figure 1:
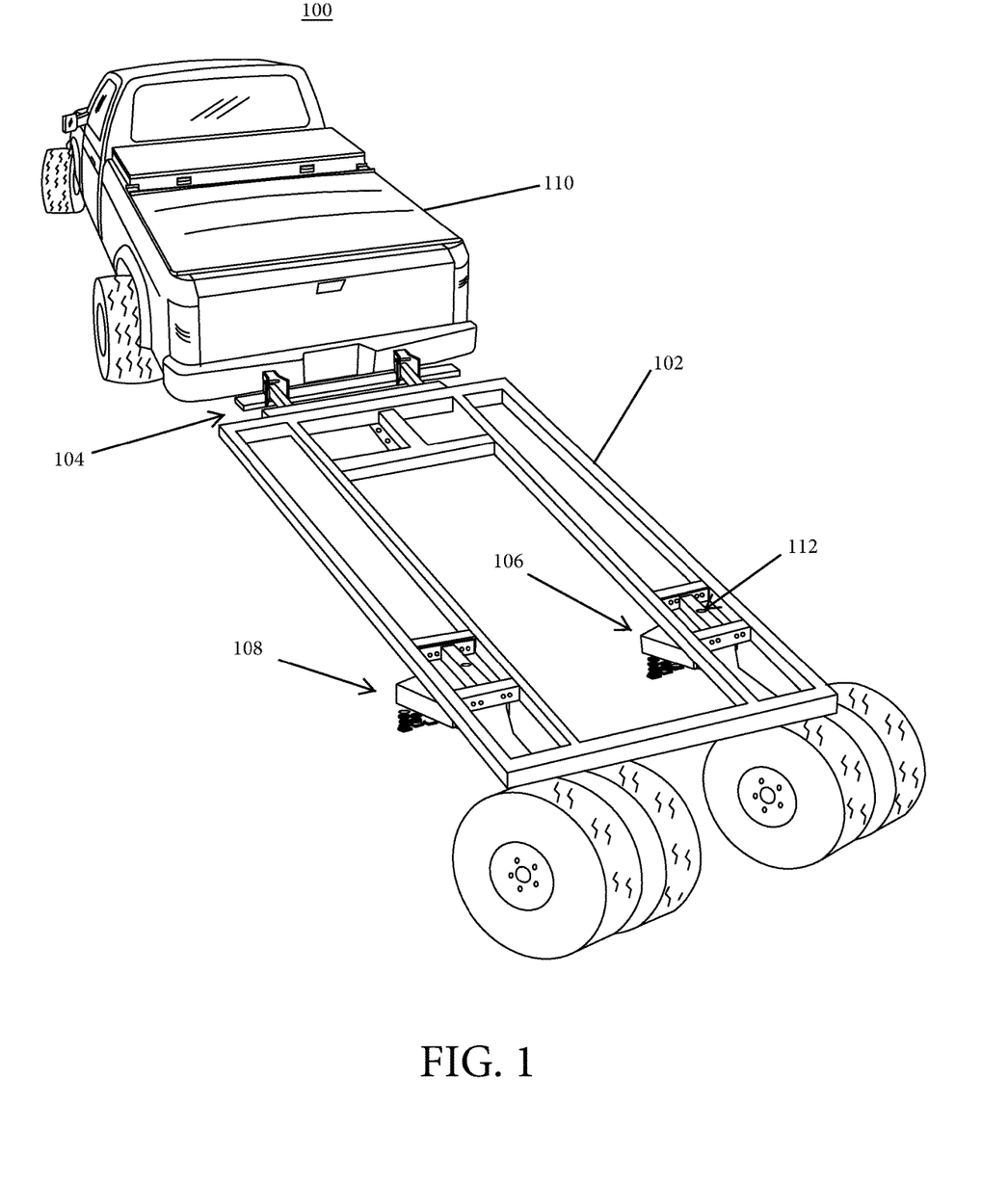
FIG. 1 is a top rear perspective view diagram of an example swivel trailer in accordance with some implementations.

FIG. 1 is a top rear perspective view diagram of an example swivel trailer in accordance with some implementations. The swivel trailer 100 includes a frame 102, a swivel hitch 104, a first swivel axle 106, a second swivel axle 108, and swivel axle pivot points 112. FIG. 1 also shows an example vehicle 110 towing the swivel trailer 100.

The swivel hitch 104 couples to the vehicle 110 at two locations via a first coupler 210, and a second coupler 212 these couplers allow the hitch to pivot on the x axis but making it ridged and not allowing it to pivot separate from the vehicle 110 on the z axis like a traditional hitch. The first and second swivel axle (106,108) allow the trailer to track behind the vehicle 110 without pivoting at the hitch.

Figure 2:
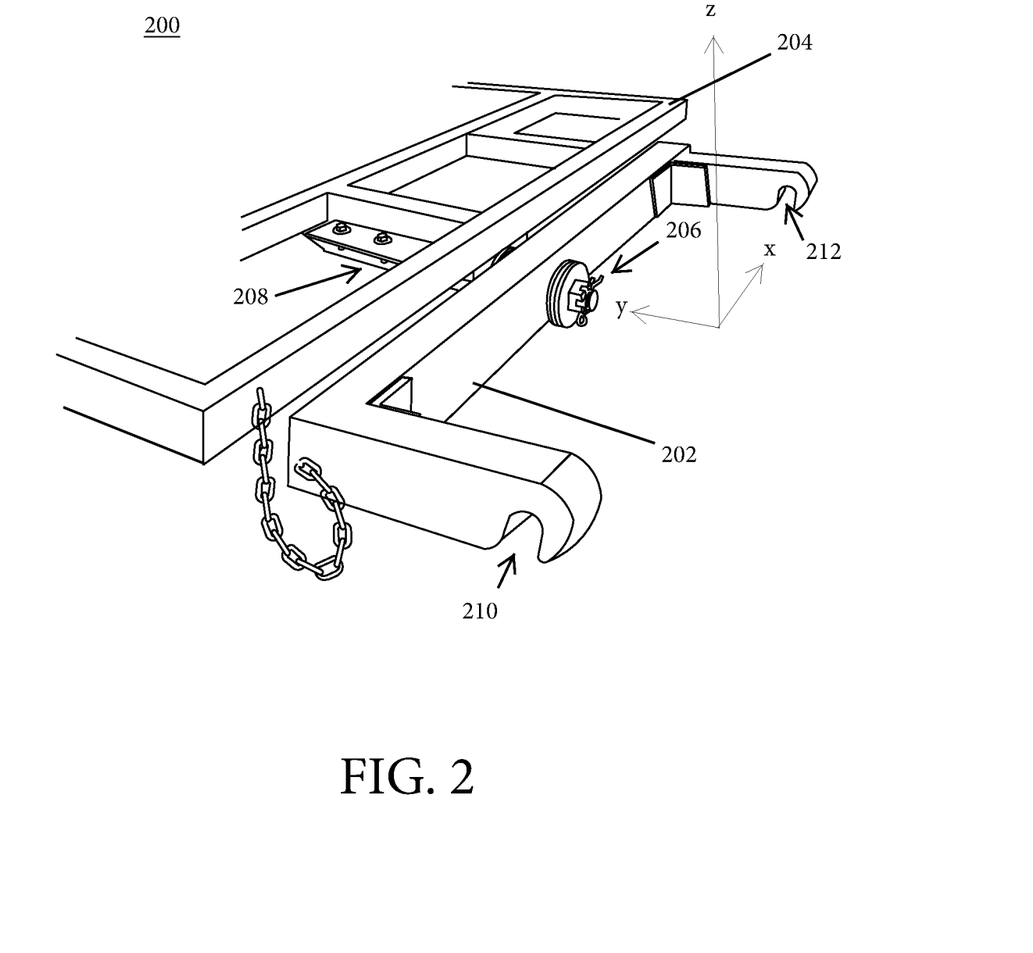
FIG. 2 is a side perspective view diagram of an example swivel trailer's swivel hitch in accordance with some implementations.

FIG. 2 is a side perspective view diagram of an example swivel trailer's swivel hitch in accordance with some implementations. The swivel hitch 200 includes a swivel hitch 202, a frame 204, center attachment point 206, a removable hitch mount 208, a first coupler 210, a second coupler 212, and an x y z axis ledger.

The swivel hitch 202 is mounted to the frame 102 via the removable hitch mount 208. This making the swivel hitch 202 and both the first and second swivel axle (106,108) removable installed onto the frame 102, which helps with cost in manufacturing and repairs.

Figure 3:
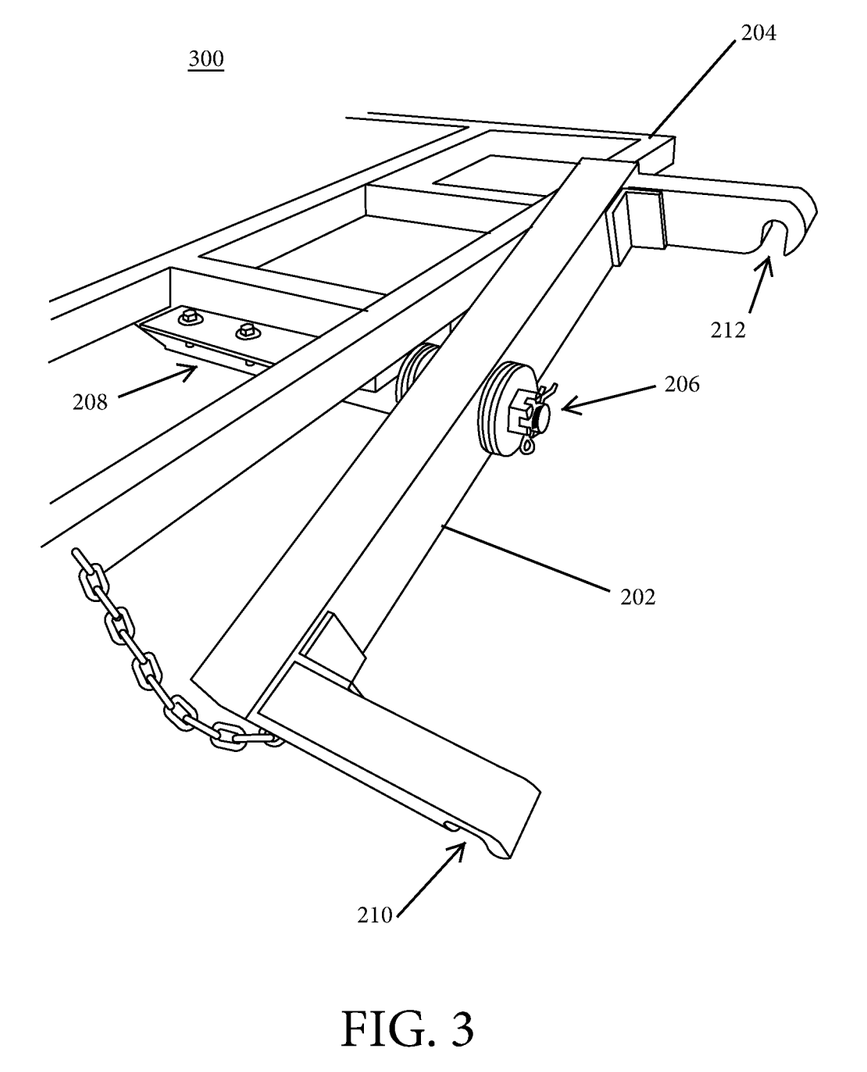
FIG. 3 is a side perspective view diagram of an example swivel trailer's swivel hitch in accordance with some implementations.

FIG. 3 is a side perspective view diagram of an example swivel trailer's swivel hitch in accordance with some implementations. The swivel hitch 300 includes a swivel hitch 202, a frame 204, a center attachment point 206, and a removable hitch mount 208, a first coupler 210, and a second coupler 212.

The center attachment point 206 allows the swivel trailer to pivot on the y axis. This permits the vehicle 110 and the swivel trailer to travel on uneven terrain.

The swivel hitch 300 depicts a swivel hitch in a rotated position.

Figure 4:
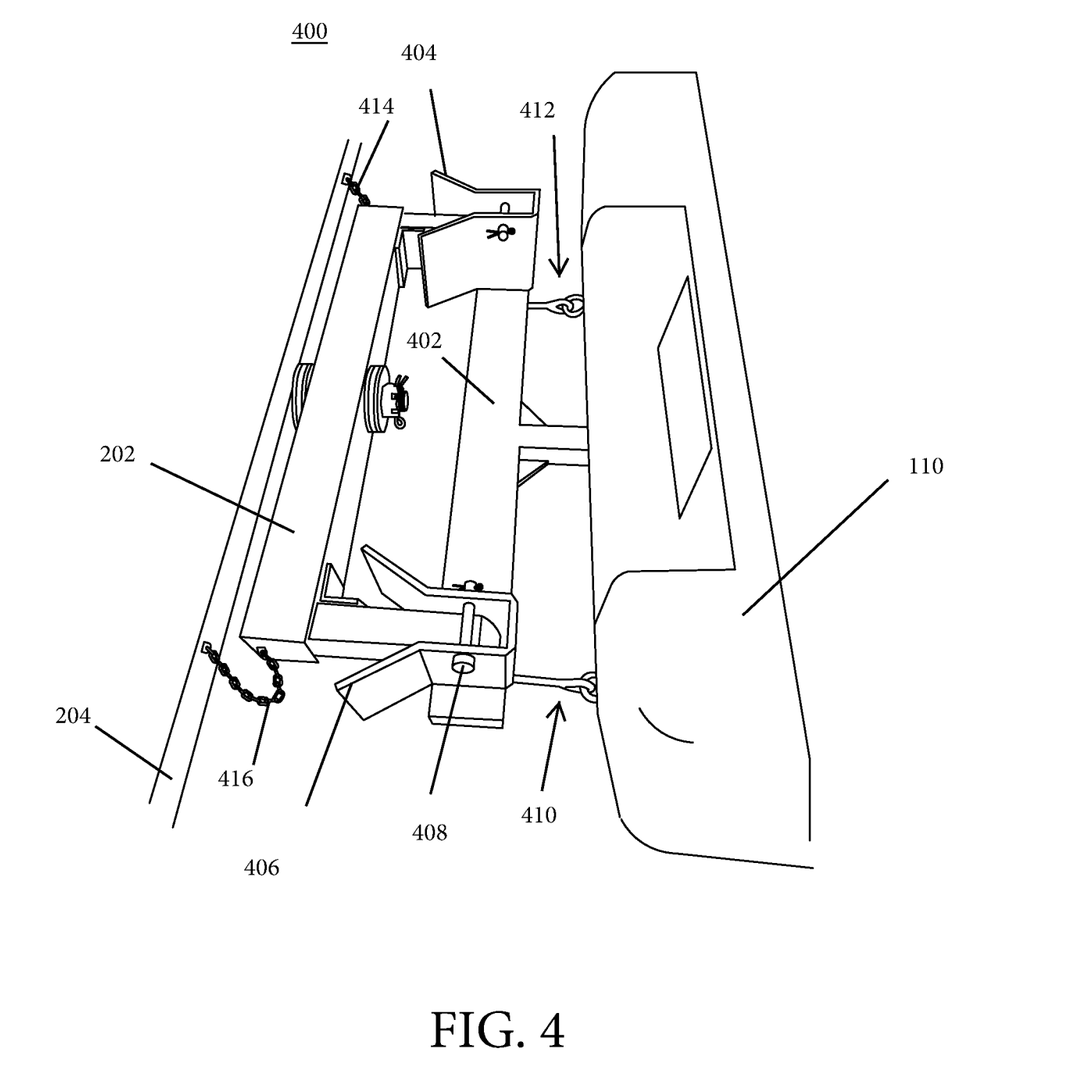
FIG. 4 is a side perspective view diagram of an example swivel trailer's swivel hitch coupled to a vehicle in accordance with some implementations.

FIG. 4 is a side perspective view diagram of an example swivel trailer's swivel hitch coupled to a vehicle in accordance with some implementations. The swivel hitch 400 includes a vehicle 110, a swivel hitch 202, a frame 204, a receiver 402, a first guide receiver 404, a second guide receiver 406, a locking pin 408, a first stabilizer support 410, a second stabilizer support 412, a first y pivot stop 414, and a second y pivot stop 416.

The first and second stabilizer supports (410, 412) assist in taking out any play or movement in the receiver 402, thereby making it ridged to the vehicle 110. The first and second y pivot stops (414, 416) prevent the swivel trailer from pivoting too far on the y axis.

Figure 5:
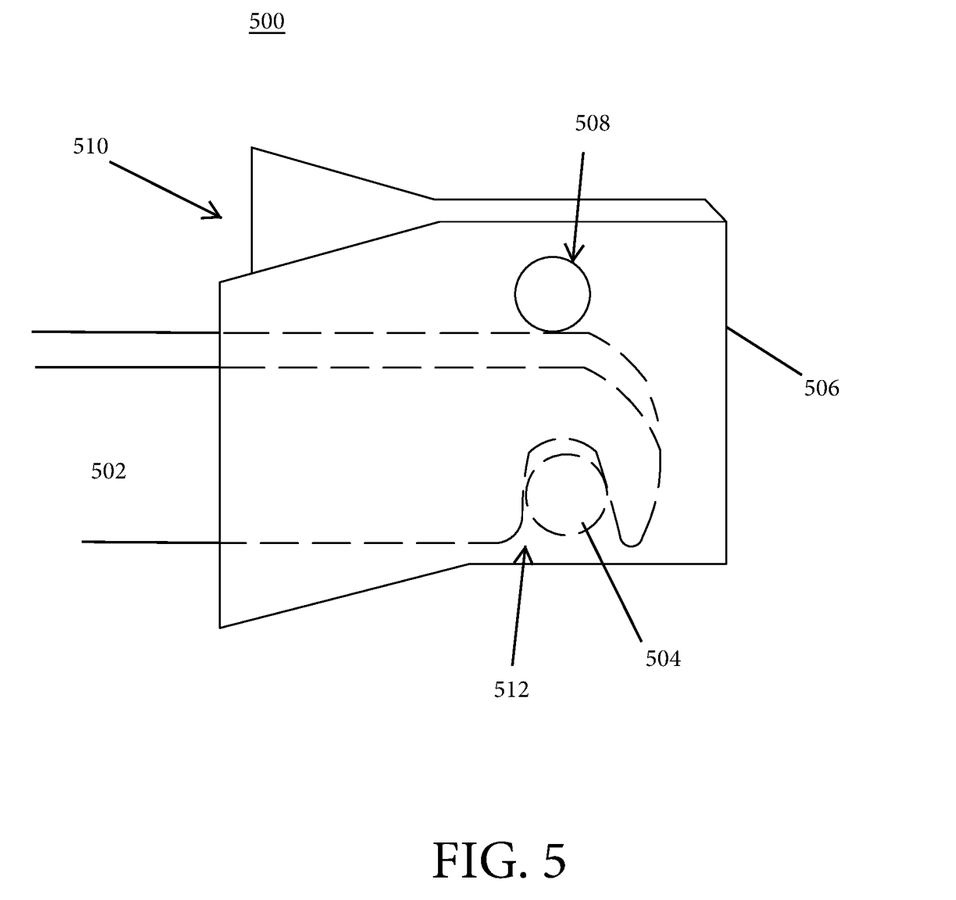
FIG. 5 is a diagram showing a closeup view of an example swivel trailer's guide receiver in accordance with some implementations.

FIG. 5 is a diagram showing a closeup view of an example swivel trailer's guide receiver in accordance with some implementations. The guide receiver 500 includes a swivel hitch 502, a horizontal king pin 504, a guide receiver 506, a locking pin 508, an angled alignment guide 510, and a coupler 512.

The angled alignment guide 510 assist in alignment while coupling to the swivel trailer. The locking pin 508 is installed after the coupler 512 is coupled around the horizontal king pin 504 securing the swivel hitch 502 to the receiver 402.

Figure 6:
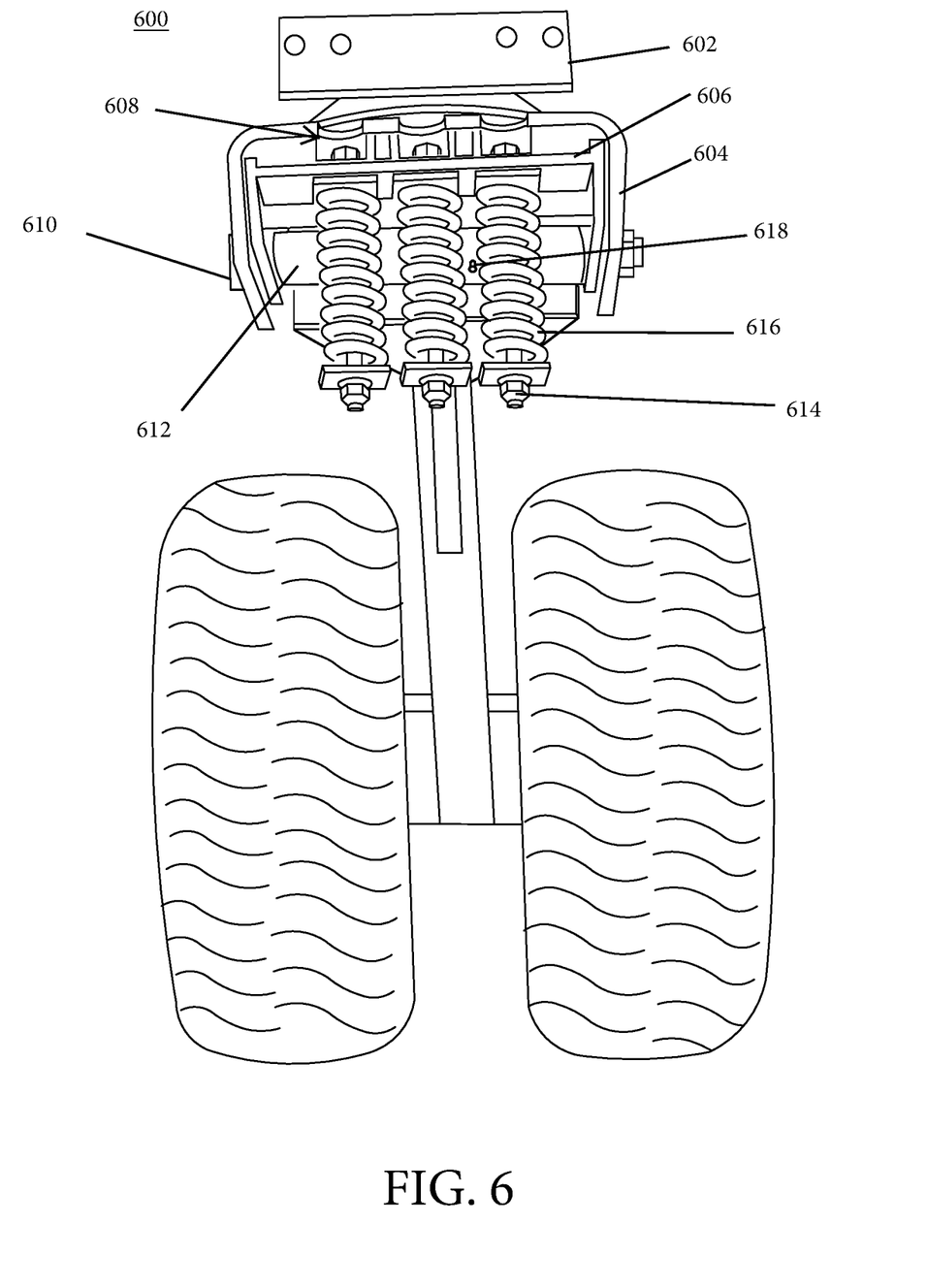
FIG. 6 is a front view diagram of an example swivel trailer's swivel axle in accordance with some implementations.

FIG. 6 is a front view diagram of an example swivel trailer's swivel axle in accordance with some implementations. The swivel axle 600 includes a vertical spindle base mount 602, a caster assembly channel 604, a caster wheel assembly 606, a hardware recess 608, a pivot bolt 610, a pivot bolt support tube 612, spring hardware 614, an axle springs 616, and a grease fitting 618.

The caster assembly channel 604 is attached to the caster wheel assembly 606 at two attachment points. The first attachment point is near a rear position of the caster assembly channel 604 and connects via the pivot bolt 610 that passes through the pivot bolt support tube 612. This attachment point allows the caster assembly channel 604 and the caster wheel assembly 606 to pivot. The second attachment point is near a front position of the caster assembly channel 604. This is a flexible attachment point created via the axle springs 616 and the spring hardware 614. The hardware recess 608 provides a space for the spring hardware 614 to sit and not interfere with movement between the vertical spindle base mount 602 and the caster assembly channel 604.

The pivot bolt support tube 612 has a void in the center area and can be greased via the grease fitting 618 to lube the pivot bolt 610.

Figure 7:
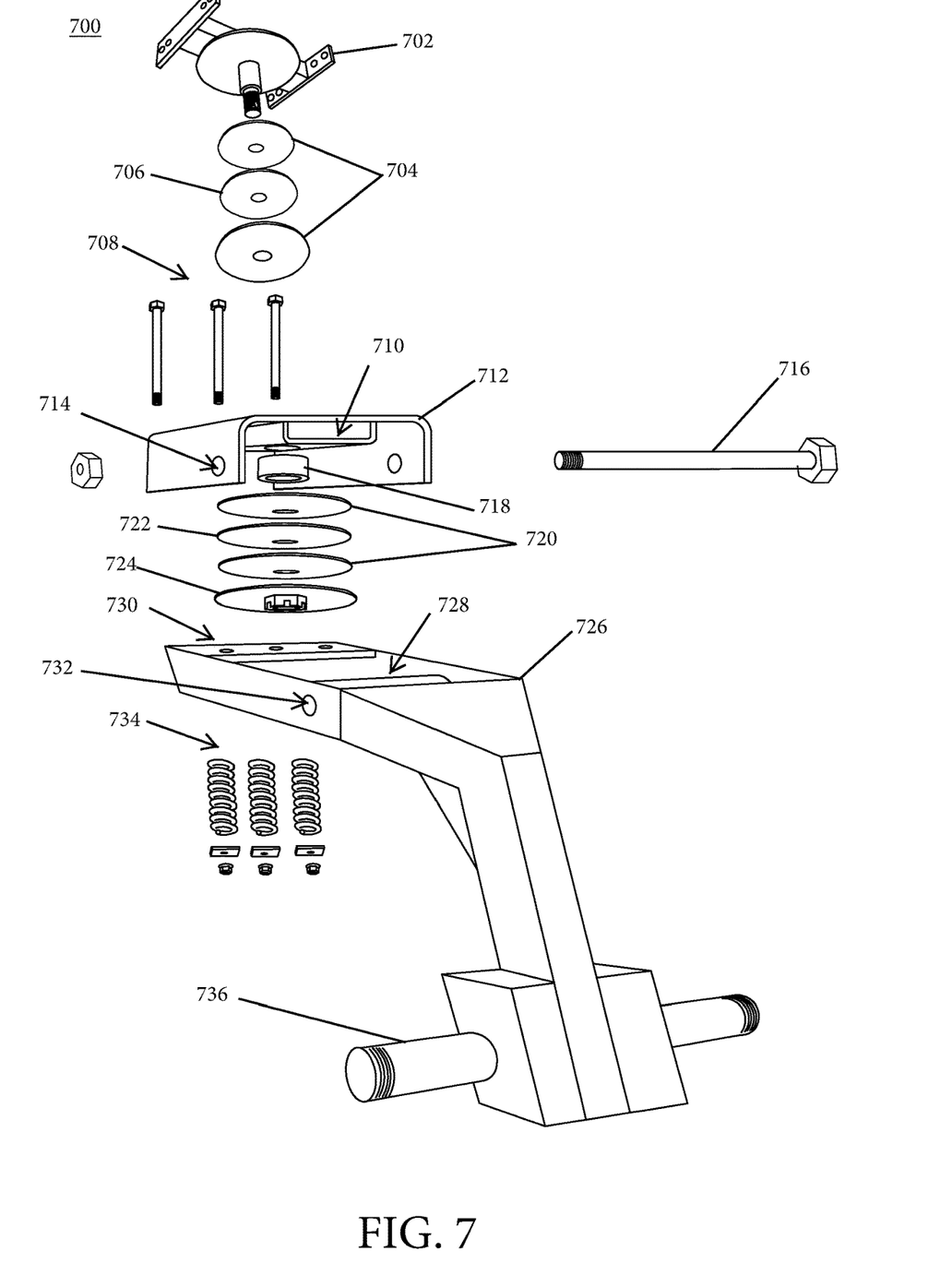
FIG. 7 is a perspective exploded view diagram of an example swivel trailer's swivel axle in accordance with some implementations.

FIG. 7 is a perspective exploded view diagram of an example swivel trailer's swivel axle in accordance with some implementations. In some implementations, the swivel axle can be bolted on for ease of installation and replacement in the event the swivel axle gets damaged. In other implementations, the swivel axle can be welded to the chassis to help reduce manufacturing cost. The swivel axle 700 includes a vertical spindle base mount 702, a set of spindle anti-friction disk 704, a spindle steel disk 706, spring hardware 708, a bearing housing/caster disk support 710, a caster assembly channel 712, a caster assembly channel pivot hole 714, a pivot bolt 716, a spindle bearing 718, a set of caster anti-friction disk 720, a caster steel disk 722, a spindle nut and washer 724, a caster wheel assembly 726, a pivot bolt support tube 728, a spring support 730, a caster wheel assembly pivot hole 732, axle springs 734, axle spindle 736.

The spindle steel disk 706 is placed between the set of spindle anti-friction disk 704 creating a first slip joint. This first slip joint is placed between the vertical spindle base mount 702 and the caster assembly channel 712. The caster steel disk 722 is placed between the set of caster anti-friction disk 720 creating a second slip joint. This second slip joint is placed between the bearing housing/caster disk support 710 and the spindle nut and washer 724. The first and second slip joints a long with the spindle bearing 718 allow the caster assembly channel 712 and connecting components to pivot freely from the vertical spindle base mount 702. This slip joint design is engineered to support heavy cargo.

In some implementations, the spindle steel disk 706 and the caster steel disk 722 could be made of a non-corrosive material (e.g., stainless steel, carbon steel, galvanized steel, aluminum, red metals).

In some implementations, the set of spindle anti-friction disk 704 and the set of caster anti-friction disk 720 could be made of a plastic material (e.g., phenolics, acetals, and nylon).

Figure 8:
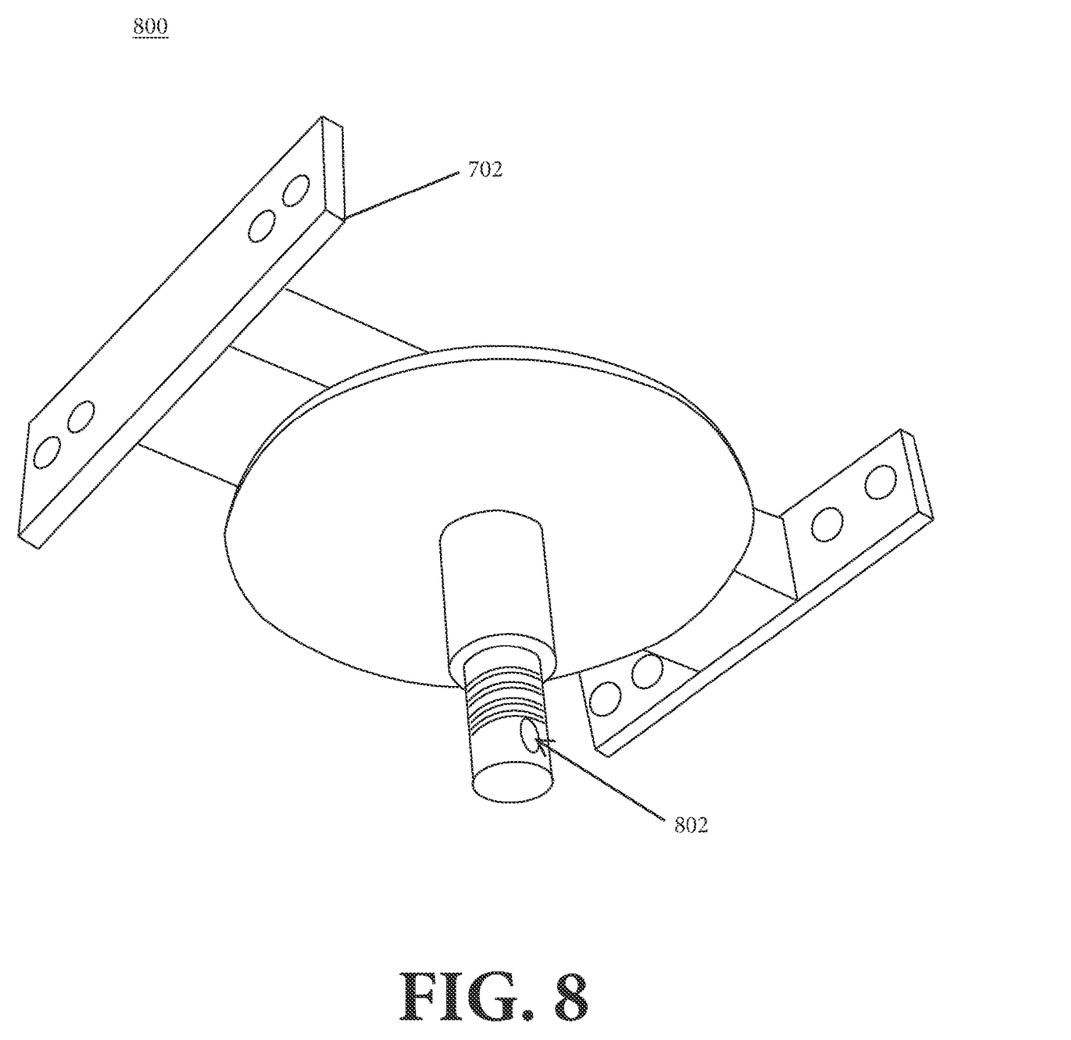
FIG. 8 is a bottom view diagram of an example swivel trailer's vertical swivel mount in accordance with some implementations.

FIG. 8 is a bottom view diagram of an example swivel trailer's vertical swivel mount in accordance with some implementations. The vertical swivel mount 800 includes a vertical spindle base mount 702, an elongated pin slot 802.

The elongated pin slot 802 allows for adjustment on the spindle nut and washer 724. This can help compensate for tolerance issues with material and assure that the proper torque can be reached.

Figure 9:
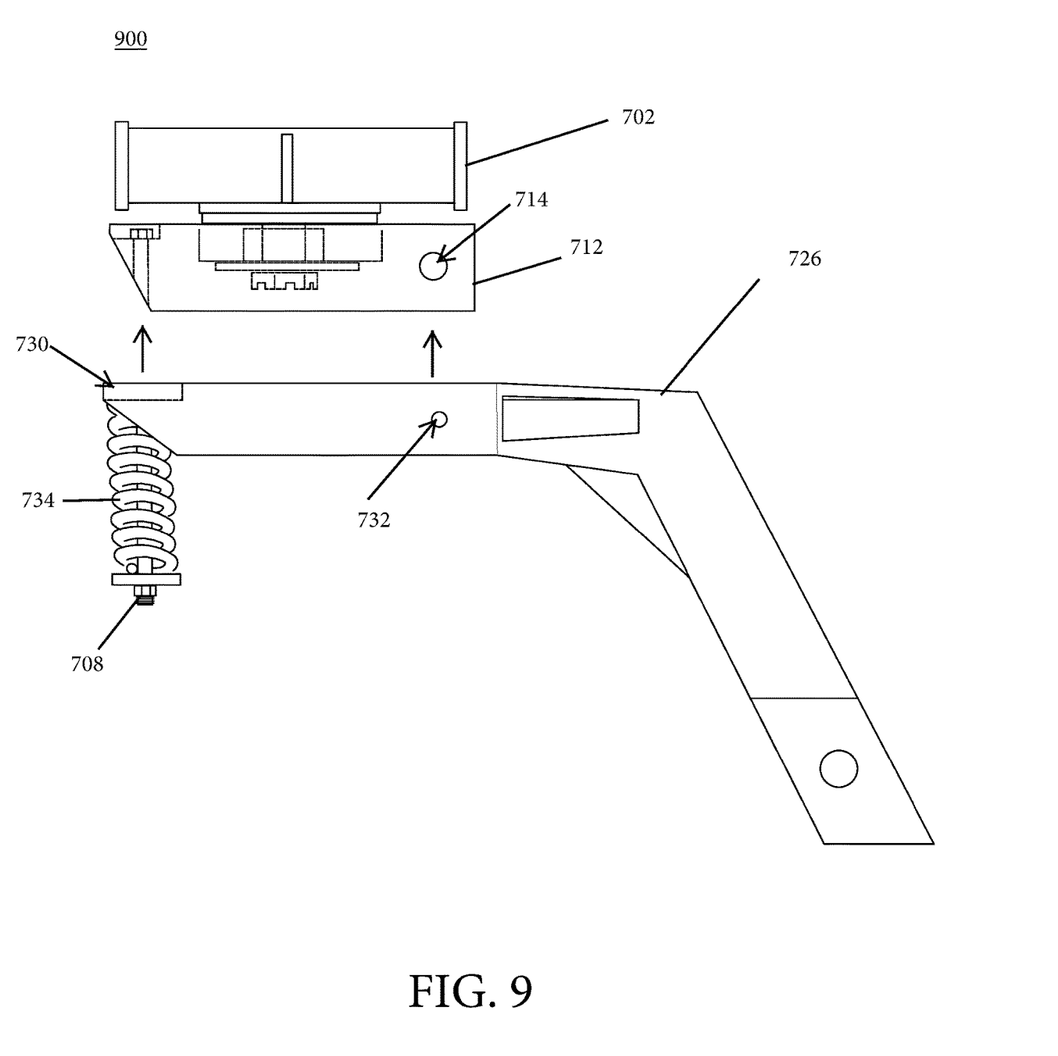
FIG. 9 is a side exploded view diagram of an example swivel trailer's swivel axle in accordance with some implementations.

FIG. 9 is a side exploded view diagram of an example swivel trailer's swivel axle in accordance with some implementations. The swivel axle 900 includes a vertical spindle base mount 702, spring hardware 708, a caster assembly channel 712, a caster assembly channel pivot hole 714, a caster wheel assembly 726, a spring support 730, a caster wheel assembly pivot hole 732, axle springs 734.

The bottom of the spring support 730 provides a strong support area for the axle springs 734 to rest while countering the force being applied by the weight on the swivel trailer.

Figure 10:
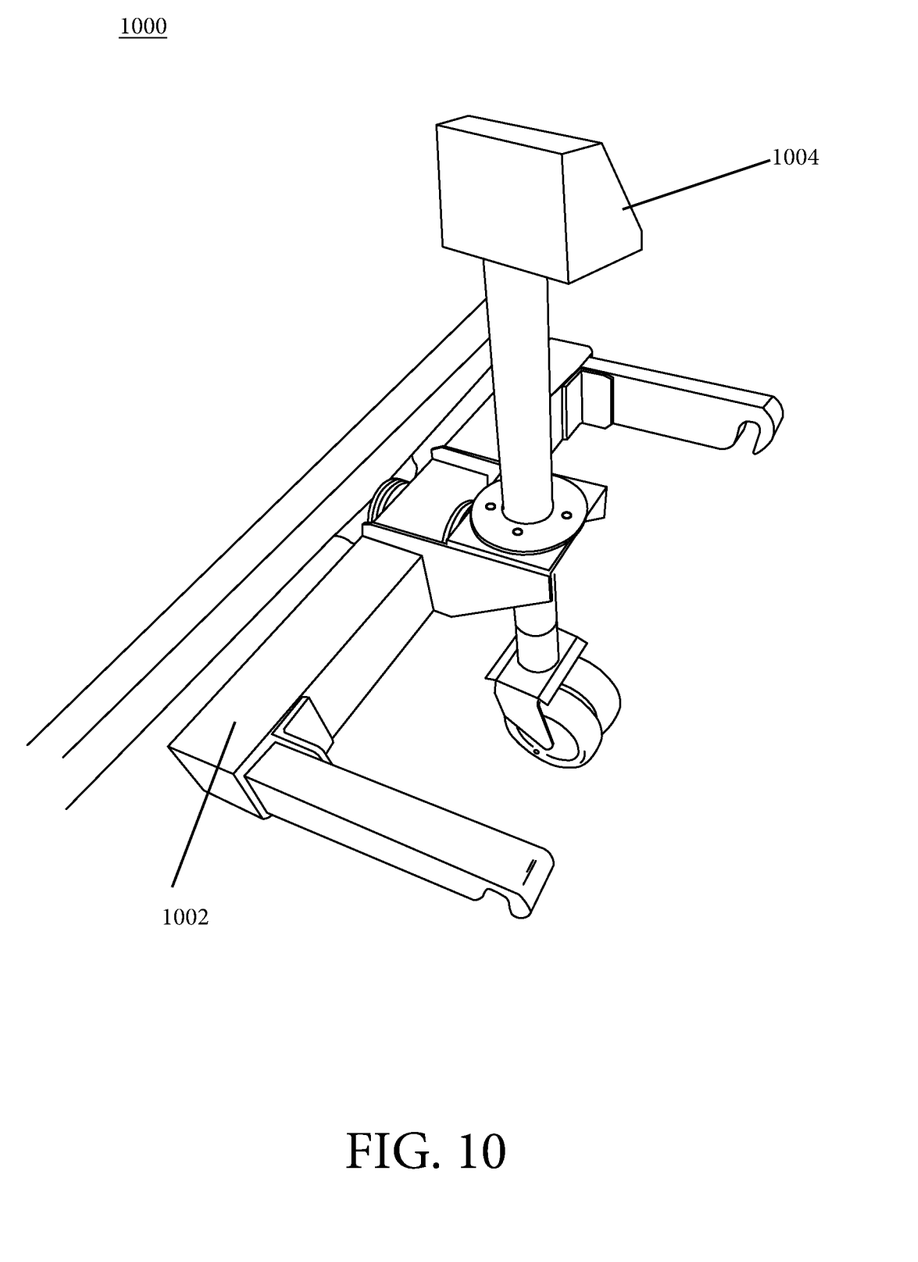
FIG. 10 is a side perspective view diagram of an example swivel trailer's swivel hitch in accordance with some implementations.

FIG. 10 is a side perspective view diagram of an example swivel trailer's swivel hitch in accordance with some implementations. The swivel hitch 1000 includes a swivel hitch 1002, and an electric jack 1004.

The electric jack 1004 provides stability to the front of the swivel trailer when it is not coupled to the vehicle 110. The electric jack 1004 is mounted in the center of the swivel hitch 1002 while this provides stability to the swivel trailer it does not restrict the swivel hitch 1002 from rotating for proper alignment as needed while being coupled to the vehicle 110. The electric jack 1004 could be replaced with a manual tongue jack.

While some example implementations have been described in terms of a general embodiment with several specific example modifications, it is recognized that other modifications, implementations, and variations of the embodiments described above are within the spirit and scope of the disclosed subject matter. Applicant intends to embrace any and all such modifications, variations, embodiments, and implementations.

What is claimed is:

1. A swivel trailer and hitch system comprising:
   a frame support having a first attachment point, a second attachment point, and a third attachment point;
   a swivel hitch receiver having a first coupler a second coupler and a third coupler, where in the third coupler is constructed to couple to a vehicle;
   a swivel hitch having a first side and a second side, wherein the first side includes a center attachment point constructed to couple to the frame's first attachment point and pivot on a y axis, wherein the second side includes a first coupler and a second coupler constructed to couple to the swivel hitch receiver's first coupler a second coupler and pivot on an x axis;
   a first swivel axle constructed to couple to the second attachment point at a rear position; and
   a second swivel axle constructed to couple to the third attachment point at a rear position.

2. A swivel hitch comprising:
   a swivel hitch;
   a receiver;
   a first guide receiver;
   a second guide receiver;
   a first y pivot stop; and
   a second y pivot stop.

3. The swivel hitch of claim 2, wherein the first and second guide receiver each include a locking pin.

4. The swivel hitch of claim 2, further comprising a first stabilizer support and a second stabilizer support.

5. The swivel hitch of claim 2, further comprising an electric jack.

6. The swivel hitch of claim 2, further comprising a manual jack.

7. A swivel axle comprising:
   a vertical spindle base mount constructed to attached to a trailed frame;
   a caster assembly channel constructed to rotate on a z axis on the vertical spindle base mount; and
   a caster wheel assembly having an axle spindle and constructed to attached to the caster assembly channel at a first attachment point and a second attachment point, wherein the first attachment point allows the caster wheel assembly to rotate x axis, wherein the second attachment point is constructed to apply a counter force.

8. The swivel axle of claim 7, wherein springs supply a counter force.

9. The swivel axle of claim 7, wherein the caster assembly channel includes a bearing housing/caster disk support and a spindle nut and washer.

10. The swivel axle of claim 9, wherein a set of spindle anti-friction disk and a spindle steel disk form a first slip joint between the vertical spindle base mount and caster assembly channel, wherein a set of caster anti-friction disk and a caster steel disk form a second slip joint between the bearing housing/caster disk support and the spindle nut and washer.

11. The swivel axle of claim 7, wherein caster wheel assembly includes a pivot bolt support tube.

12. The swivel axle of claim 7, wherein the caster wheel assembly includes a spring support.

* * * * *